United States Patent [19]
Kanno

[11] Patent Number: 5,805,354
[45] Date of Patent: Sep. 8, 1998

[54] ZOOM LENS BARREL WITH REVERSIBLE TELEPHOTO LENS MOVEMENT

[75] Inventor: Hideo Kanno, Chiba, Japan

[73] Assignee: Nikon Corporation, Tokyo, Japan

[21] Appl. No.: 850,702

[22] Filed: May 2, 1997

[30] Foreign Application Priority Data

Jul. 5, 1996 [JP] Japan ................................. 8-176037

[51] Int. Cl.⁶ .................................................. G02B 15/14
[52] U.S. Cl. .......................................................... 359/701
[58] Field of Search .................................. 359/696, 701, 359/823; 396/79, 85, 379

[56] References Cited

U.S. PATENT DOCUMENTS

| | | | |
|---|---|---|---|
| 4,976,523 | 12/1990 | Ishikawa | 359/696 |
| 5,016,993 | 5/1991 | Akitake | 359/696 |
| 5,140,468 | 8/1992 | Kayanuma | 359/699 |
| 5,144,490 | 9/1992 | Yamanouchi | 359/694 |
| 5,159,370 | 10/1992 | Takahashi | 354/195.12 |
| 5,204,710 | 4/1993 | Tsukamoto et al. | 359/402 |
| 5,210,644 | 5/1993 | Nomura | 359/694 |
| 5,282,090 | 1/1994 | Suzuki et al. | 359/696 |
| 5,486,888 | 1/1996 | Shiina et al. | 354/187 |
| 5,576,894 | 11/1996 | Kuwana et al. | 359/701 |

Primary Examiner—Georgia Y. Epps
Assistant Examiner—Ricky Mack
Attorney, Agent, or Firm—Morgan, Lewis, Bockius LLP

[57] ABSTRACT

In order to improve zooming operability, there is disclosed a zoom lens barrel comprising a driving mechanism for driving an optical system in the direction of an optical axis while being moved in the direction of the optical axis during a zooming operation, wherein at least a part of the optical system is a U-turn optical system which changes its moving direction during the zooming operation. The zoom lens barrel includes another driving mechanism for driving the U-turn optical system, which is not moved in the direction of the optical axis and provided independently of the former driving mechanism.

10 Claims, 3 Drawing Sheets

ZOOM LENS BARREL WITH REVERSIBLE TELEPHOTO LENS MOVEMENT

This application claims the benefit of Japanese Patent Application No. 8-176037 which is hereby incorporated by reference.

BACKGROUND OF THE INVENTION

1. Field of the Invention

The present invention relates to a zoom lens barrel which is provided with a driving mechanism for driving an optical system in the direction of an optical axis while being moved in the direction of an optical axis during a zooming operation, wherein at least a part of the optical system changes its moving direction during the zooming operation.

2. Description of the Related Art

Conventionally, as a zoom lens barrel which employs a focusing system other than a so-called front lens moving type, a zoom lens barrel of an inner focusing system has been known. In the zoom lens barrel which employs an inner focusing system, a correction cam ring is used in order to keep a focusing state constant during a zooming operation. The correction cam ring is a cam ring for driving a group of lenses in the direction of an optical axis during zooming, and this ring itself is moved in the direction of an optical axis in response to the zooming operation. In other words, in the conventional zoom lens barrel, by moving the correction cam ring in the direction of an optical axis, the moving amount of a focusing lens which changes following the zooming operation, is corrected.

In the conventional zoom lens barrel of an inner focusing system, even though the moving direction of each lens group moved by zooming coincides with that of the correction cam ring or even though the moving directions of the lens group and the cam ring are different from each other, a difference in moving amounts between the lens group and the cam ring is small. Accordingly, a moving cam groove provided in the correction cam ring for driving the lens group has a shape which intersects an optical axis at a relatively large angle. Thus, the working efficiency of a cam mechanism including the moving cam groove (driving mechanism of the lens group), was relatively good.

In recent years, however, there has been appeared a zoom lens barrel, wherein a part of a lens group which constitutes an optical system changes its moving direction and makes a U-turn along an optical axis during a zooming operation from a wide side to a tele side.

In the zoom lens barrel of this type, a correction cam ring and the lens group which makes a U-turn, move in completely opposite directions within the range of a certain focal distance in all the zooming regions. In other words, there is a zooming region, in which the relative moving amounts of the lens group and the correction cam ring are very large. These relative moving amounts become especially large when the lens group which makes a U-turn is a first lens group positioned in a part of the optical system closest to a subject side. Accordingly, a moving cam groove provided on the correction cam ring for driving the lens group making a U-turn, has a shape which intersects an optical axis at a small angle, in other words, a shape remarkably elongated the direction of an optical axis against the rotational angle of the correction cam ring. Consequently, a driving mechanism including the moving cam groove has very large zooming torque, resulting in bad working efficiency, and thus the mechanism is not suitably used for the zooming operation. Moreover, when the lens group making the U-turn moving is the first lens group, these problems are particularly serious.

SUMMARY OF THE INVENTION

It is an object of the present invention to provide a zoom lens barrel having a driving mechanism for driving an optical system in the direction of an optical axis while being moved in the direction of an optical axis during a zooming operation, wherein at least a part of the optical system is a zoom lens barrel changing its moving direction during the zooming operation, thereby improving zooming operability.

The object of the present invention is achieved by a zoom lens barrel comprising a driving mechanism for driving an optical system in the direction of an optical axis while being moved in the direction of an optical axis during a zooming operation, at least a part of the optical system is being the zoom lens barrel as a U-turn optical system changing its moving direction during the zooming operation, wherein another driving mechanism for driving the U-turn optical system without moving in the direction of an optical axis is provided independently from the foregoing driving mechanism.

For a more complete understanding of the present invention and the advantages thereof, reference is now made to the following description taken in conjunction with the accompanying drawings.

DESCRIPTION OF THE PREFERRED EMBODIMENTS

The preferred embodiment of the present invention will be described below more in detail with reference to the accompanying drawings.

Figure 1:
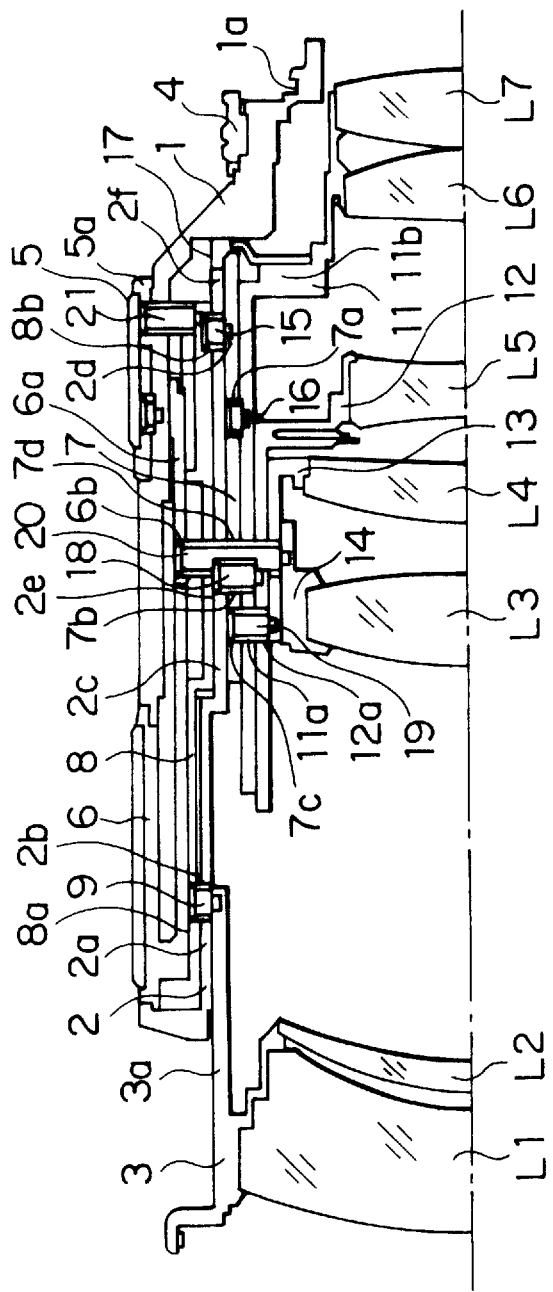
FIG. 1 is a section view of a zoom lens barrel of an embodiment of the present invention.
Figure 2:
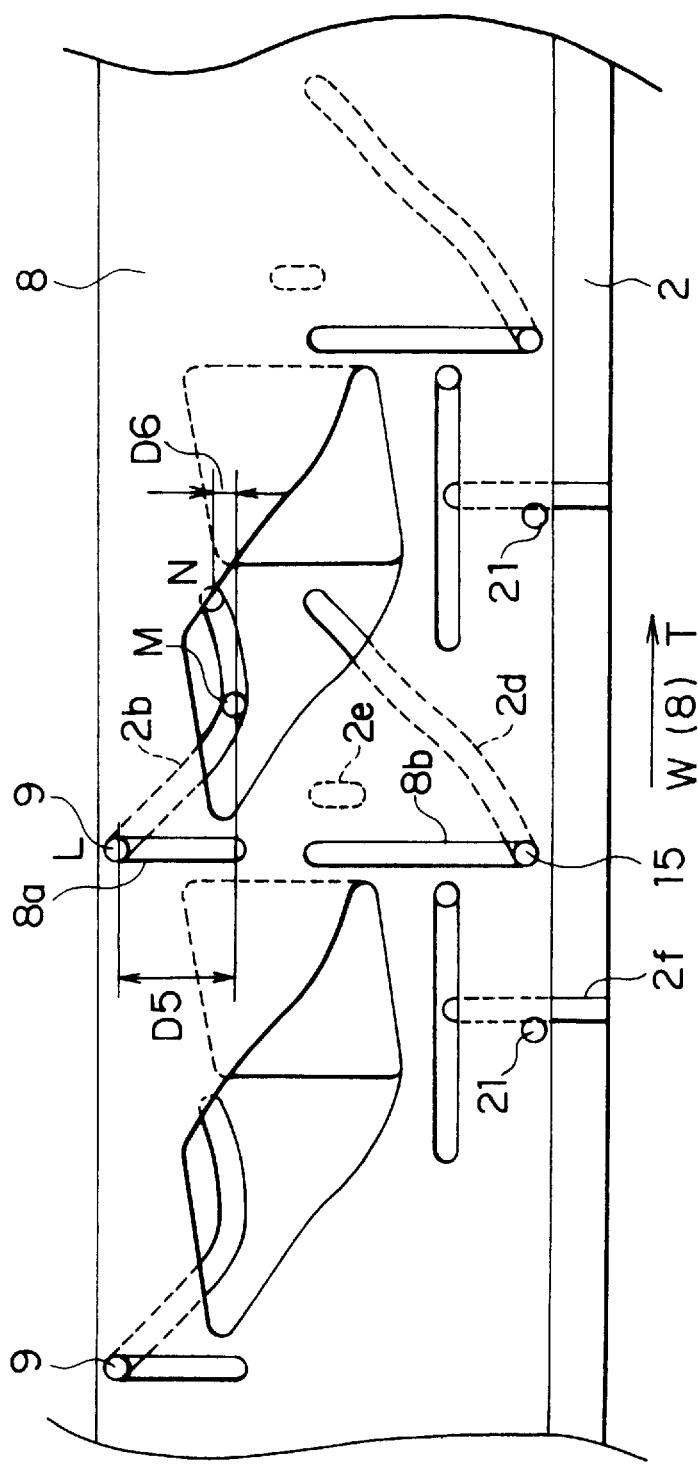
FIG. 2 is a partial development of an inner zoom ring 9 and an inner fixed barrel 2 used in the zoom lens barrel shown in FIG. 1.
Figure 3:
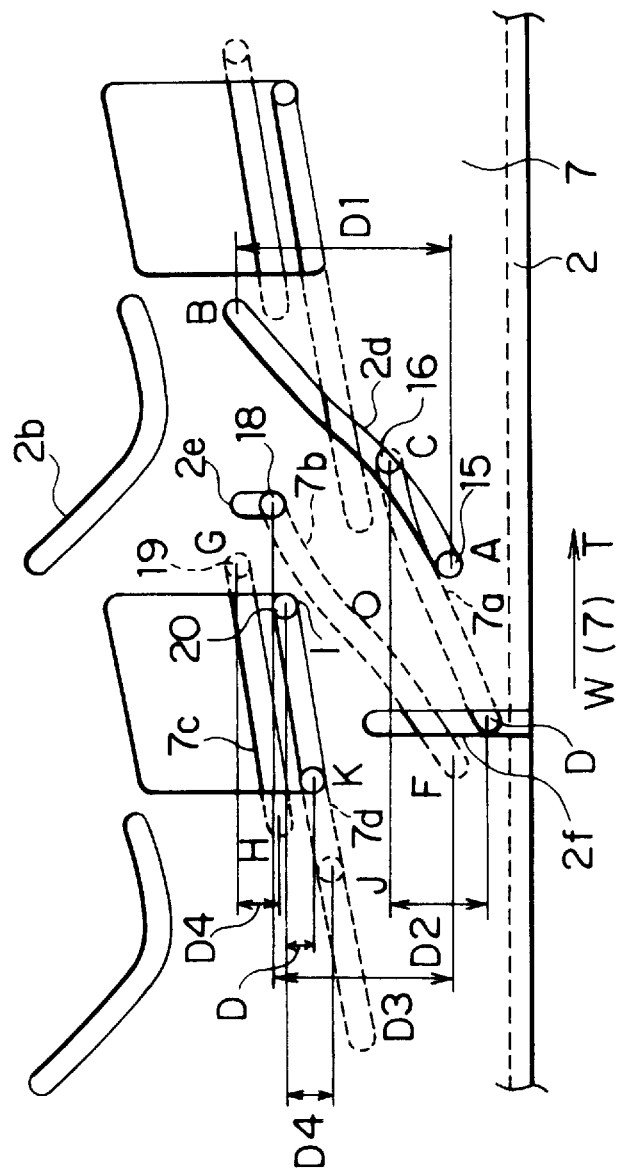
FIG. 3 is a partial development of a zoom cam ring 7 and the inner fixed barrel 2 used in the zoom lens barrel shown in FIG. 1.

FIG. 1 is a section view of a zoom lens barrel of an embodiment of the present invention, FIG. 2 is a partial development of an inner zoom ring 8 and an inner fixed barrel 2, and FIG. 3 is a partial development of a zoom cam ring 7 and the inner fixed barrel 2. A left side in FIG. 1 corresponds to the front of an optical axis (subject side), and upper sides in FIGS. 2 and 3 each corresponds to the front along the optical axis.

In the embodiment, an optical system which is composed of 5 lens groups is provided.

The first lens groups L1 and L2 are lens groups which change their moving directions in middle ways during a zooming operation performed from a wide side to a tele side and make U-turns along an optical axis. That is, the first lens groups L1 and L2 move to the rear side along the optical axis until a focal length of the optical system becomes close to an intermediate value between a wide end and a tele end and then change their moving directions. Thereafter, these lens groups move in the direction of the optical axis.

The other lens groups (second lens group L3, third lens group L4, fourth lens group L5 and fifth lens groups L6 and L7) are ones which move to the front along the optical axis from beginning to end during a zooming operation performed from the wide side to the tele side. The second lens group L3 is a lens group which functions also as a focusing lens.

Next, each member which constitutes the embodiment will be described.

An external fixed barrel 1 is a member which has a mount part 1a in the end part of the rear side along the optical axis, and is attached to a camera body (not shown) via the mount part 1a. The external fixed barrel 1 has a diaphragm ring 4 to be freely rotated in the outer peripheral part in the vicinity of the mount part 1. In the middle of the outer peripheral part of the external fixed barrel 1, there is also provided a zoom ring 5, which is freely rotated around the optical axis. A focus ring 6 is attached to the end part of the external fixed barrel 1 in the front along the optical axis so as to be held between the barrel 1 and an inner fixed barrel 2, and rotated around the optical axis.

The inner fixed barrel 2 is a member which is integrally fixed to the external fixed barrel 1 in a radially inner side of the external fixed barrel 1. The inner fixed barrel 2 has such shape that two cylindrical members having different inner diameters, that is, a large diameter part 2a and a small diameter part 2c, are connected to each other in the center. The outer peripheral part 3a of a first lens group moving frame 3 is fitted in the inner peripheral part of the large diameter part 2a so as to be moved back and forth in the direction of the optical axis. The first lens group moving frame 3 is a member for holding The first lens groups L1 and L2. In the large diameter part 2a, there is provided a moving cam groove 2b, which is used for moving the first lens groups L1 and L2 in the direction of the optical axis. The first lens group moving frame 3 has a cam pin in its outer peripheral part 3a. The cam pin 9 penetrates through the moving cam groove 2b and the tip part of the pin is fitted in the guiding groove 8a of an inner zoom ring 8.

The moving cam groove 2b is a cam groove, which has a shape projecting to the rear side along the optical axis and bent as shown in FIG. 2. Accordingly, the cam pin 9 moves by a distance D5 to the rear side along the optical axis from a position L to a position M along the shape of the moving cam groove 2b, and then moves by a distance D6 to the front along the optical axis from the position M to a position N. In other words, the cam pin 9 changes its movement direction in the middle way and makes a U-turn to the direction of the optical axis.

The inner zoom ring 8 is a member, which is fitted in the outer peripheral part of the inner fixed barrel 2 so as to be freely rotated around the optical axis. The guiding groove 8a is a straight advance guiding groove, which is provided in the front part of the inner zoom ring 8 in parallel with the optical axis.

When the inner zoom ring 8 has been rotated, its motion is transmitted through the guiding groove 8a to the cam pin 9. The cam pin 9 is then moved along the moving cam groove 2b. Consequently, the first lens group moving frame 3 is moved back and forth in the direction of the optical axis along the shape of the moving cam groove 2b while being rotated around the optical axis. As described above, the first lens group moving frame 3 is first moved to the rear side along the optical axis and then the direction of its movement is changed to the front along the optical axis in the middle way.

In the case of the small diameter part 2c of the inner fixed barrel 2, a zoom cam ring 7 is fitted in its inner peripheral part so as to be rotated around the optical axis and to be moved back and forth in the direction of the optical axis. The zoom cam ring 7 is a member, which has moving cam grooves (7a to 7d) for regulating the zooming operation of each lens groups selected from the second to the fifth lens groups. The zoom cam ring 7 also has a cam pin 15 in its outer peripheral part. The cam pin 15 penetrates through a moving cam groove 2d provided in the small diameter part 2c of the inner fixed barrel 2, and the tip part of the pin is fitted in the guiding groove 8b provided in the inner zoom ring 8 in parallel with the optical axis. Accordingly, the inner zoom ring 8 and the zoom cam ring 7 are united in the direction of rotation around the optical axis. When the inner zoom ring 8 is rotated, the zoom cam ring 7 is also rotated by the same angle. When the zoom cam ring 7 is rotated, since the cam pin 15 is moved along the moving cam groove 2d, the zoom cam ring 7 also makes a back and forth movement along the shape of the moving cam groove 2d.

A fifth lens group moving frame 11 for holding the fifth lens groups L6 and L7 in its inner peripheral part, is fitted in the inner peripheral part of the zoom cam ring 7 so as to be moved in the direction of the optical axis. A cam pin 16 is attached to the outer peripheral part of the fifth lens group moving frame 11. The cam pin 16 is fitted in a moving cam groove 7a provided in the zoom cam ring 7. A straight advance key 17 is attached to a bent section part 11b in the middle. of the fifth lens group moving frame 11. The tip part of the straight advance key 17 is engaged with a guiding groove 2f, which is provided in the optical axis rear end part of the inner fixed barrel 2 in parallel with the optical axis. Accordingly, the fifth lens group moving frame 11 is never rotated but only moved in the direction of the optical axis.

A fourth lens group moving frame 12 for holding the fourth lens group L5 is fitted in the inner peripheral part of the fifth lens group moving frame 11. A cam pin 18 is attached to the outer peripheral part of the fourth lens group moving frame 12. The cam pin 18 penetrates through the moving cam groove 7b of the cam ring 7, and the tip part of the pin is fitted in the guiding groove 2e of the inner fixed barrel 2. The guiding groove 2e is a straight advance groove in parallel with the optical axis. Accordingly, when the cam ring 7 is rotated, the fourth lens group moving frame 12 is moved in the direction of the optical axis along the shape of the moving cam groove 7b without being rotated.

A third lens group moving frame 13 for holding the third lens group L4 is fitted in the inner peripheral part of the fourth lens group moving frame 12. A cam pin 19 is attached to the outer peripheral part of the third lens group moving frame 13. The cam pin 19 penetrates through a relief groove 12a provided in the fourth lens group moving frame 12, and a part of the pin is fitted in a guiding groove 11a, which is provided in the fifth lens group moving frame 11 in parallel with the optical axis. The tip part of the cam pin 19 is fitted in a moving cam groove 7c provided in the cam ring 7. Accordingly, when the cam ring 7 is rotated, the third lens group moving frame 13 is moved in the direction of the optical axis along the shape of the moving cam groove 7c without being rotated.

A second lens group moving frame 14 for holding the second lens group L3 is fitted in the inner peripheral part of the third lens group moving frame 13. A cam pin 20 is attached to the outer peripheral part of the second lens group moving frame 14. The cam pin 20 penetrates through relief grooves respectively provided in the third, the fourth and the fifth lens group moving frames 13, 14 and 15. A part of the cam pin 20 is fitted in the moving cam groove 7d of the cam ring 7. Furthermore, the cam pin 20 penetrates through a relief groove provided in the inner fixed barrel 2, and the tip part of the pin is fitted in a guiding groove 6b, which is provided in the small diameter part the focus ring 6 in parallel with the optical axis.

The guiding groove 6b functions as a straight advance groove for the cam pin 20 when the focus ring 6 is not rotated. Accordingly, when the cam ring 7 is rotated in this condition, the cam pin 20 and the second lens group moving frame 14 which is moved together with the cam pin 20, are moved in the direction of the optical axis along the shape of the moving groove 7d without being rotated.

When the cam ring 7 is not rotated but the focus ring 6 is rotated, the cam pin 20 is given a rotational force by the guiding groove 6b of the focus ring 6, and moved in the direction of the optical axis along the shape of the moving cam groove 7d of the cam ring 7 while being rotated.

Consequently, the second lens group moving frame 14 is also moved in the direction of the optical axis while being rotated, and thereby focusing is performed.

A pin 21 is attached to the outer peripheral part of the inner zoom ring 8. The tip part of the pin 21 penetrates through a relief groove provided in the external fixed barrel 1, and engaged with the engaging hole 5a of a zoom ring 5. Accordingly, the zoom ring 5 and the inner zoom ring 8 are united in a rotational direction.

Next, the zooming operation of the embodiment will be described by taking a change of a focal length from the wide side to the tele side as an example.

In the embodiment, zooming is performed by rotating the zoom ring 5. When the zoom ring 5 is rotated, since the tip part of the pin 21 attached to the inner zoom ring 8 is engaged with the engaging hole 5a of the zoom ring 5, the zoom ring 5 and the inner zoom ring 8 are rotated together with each other in an arrow direction shown in FIG. 2. Furthermore, the rotational motion of the inner zoom ring 8 is transmitted to the cam pin 9 via the guiding groove 8a. The cam pin 9 is then rotated along the shape of the moving cam groove 2b. Consequently, the first lens group moving frame 3 is moved in the direction of the optical axis along the shape of the moving cam groove 2b while being rotated around the optical axis. The movement of this moving frame is, as described above, accompanied by the change of the moving direction in the middle way, that is, a U-turn.

After the inner room ring 8 has been rotated, this rotational motion is alto transmitted to the cam pin 15 via the guiding groove 8b. The cam pin 15 is moved along the moving cam groove 2d and this motion is transmitted to the zoom cam ring 7. Consequently, the zoom cam ring 7 is moved in the direction of the optical axis along the shape of the moving cam groove 2d while being rotated around the optical axis in an arrow direction shown in FIG. 3. The moving amount of the zoom cam ring 7 in the direction of the optical axis, is equal to the length D1 of the moving cam groove 2d in the direction of the optical axis (see FIG. 3), and the zoom cam ring 7 moves in the direction toward the front along the optical axis.

Then, the motion of the zoom cam ring 7 is transmitted through the moving cam groove 7a and the cam pin 16 to the fifth lens group moving frame 11. As described above, the fifth lens group moving frame 11 can only make a straight advance movement in the direction of the optical axis because of the actions of the straight advance key 17 fixed to the bent section part 11b as well as the guiding groove 2f of the inner fixed barrel 2 without being rotated around the optical axis. Accordingly, the straight advance motion of the zoom cam ring 7 in the direction of the optical axis, is directly transmitted through the cam pin 16, and so on, to the fifth lens group moving frame 11. The rotational motion of the zoom cam ring 7 is converted into a straight advance motion in the direction of the optical axis by the moving cam groove 7a and the cam pin 16, and then transmitted to the fifth lens group moving frame 11. Consequently, when the zoom cam ring 7 makes only a rotational motion without being moved in the direction of the optical axis, the fifth lens group moving frame 11 is moved to the rear side along the optical axis only by a distance, which is equal to the length D2 of the moving cam groove 7a in the direction of the optical axis (see FIG. 3). When the zoom cam ring 7 makes a rotational motion while being moved in the direction of the optical axis, the fifth lens group moving frame 11 is moved in the direction of the optical axis by a distance D1–D2. This movement of the fifth lens group moving frame 11 occurs because the zoom cam ring 7 is itself moved to the front along the optical axis by the distance D1.

The motion of the zoom cam ring 7 is also transmitted through the moving cam groove 7b and the cam pin 18 to the fourth lens group moving frame 12. The cam pin 18 can make only a movement in the direction of the optical axis along the guiding groove 2e, because its tip part is fitted in the guiding groove 2e of the inner fixed barrel 2. Accordingly, after the rotation of the cam ring 7, the fourth lens group moving frame 12 is moved in the direction of the optical axis in accordance with the shape of the moving cam groove 7b without being rotated. The moving amount of the fourth lens group moving frame 12 in the direction of the optical axis, is equal to the length D3 of the moving cam groove 7b in the direction of the optical axis (see FIG. 3) when the zoom cam ring 7 is not moved in the direction of the optical axis, and its moving direction is toward the rear side along the optical axis. However, during zooming, the zoom ring 7 is moved to the front along the optical axis by the distance D1. Consequently, the moving amount of the fourth lens group moving frame 12 in the direction of the optical axis is D1–D3 to the front along the optical axis.

The motion of the zoom ring 7 is also transmitted through the moving cam groove 7c and the cam pin 19 to the third lens group moving frame 13. A part of the cam pin 19 is fitted in the guiding groove 11a, which is provided in the fifth lens group moving frame 11 in parallel with the optical axis. Accordingly, after the rotation of the cam ring 7, the cam pin 19 and the third lens group moving frame 13, to which the cam pin 19 has been attached, are moved in the direction of the optical axis, in accordance with the shape of the moving cam groove 7c without being rotated. The moving amount of the third lens group moving frame 13 in the direction of the optical axis is equal to the length D4 of the moving cam groove 7c in the direction of the optical axis (see FIG. 3) when the zoom ring 7 is not moved in the direction of the optical axis, and its moving direction is toward the rear side along the optical axis. Consequently, the moving amount of the third lens group moving frame 13 during zooming is D1–D4 to the front along the optical axis.

Furthermore, the motion of the zoom cam ring 7 is also transmitted through the moving cam groove 7d and the cam pin 20 to the second lens group moving frame 14. As described above, the tip part of the cam pin 20 is fitted in the guiding groove 6b provided in the focus ring 6. Thus, when the focus ring 6 is not rotated, the guiding groove 6b functions as a straight advance groove for the cam pin 20. Accordingly after the rotation of the cam ring 7, the cam pin 20 and the second lens group moving frame 14 moved together with the cam pin 20 are moved in the direction of the optical axis in accordance with the shape of the moving cam groove 7d without being rotated. In this case, the moving amount of the second lens group moving frame 14 is D1–D4, which is a difference between the moving amount D1 of the zoom cam ring 7 and the relative moving amount D4 of the second lens group moving frame 14 relative to the zoom cam ring 7 (see FIG. 3), and its moving direction is toward the front along the optical axis. The moving cam groove 7c is a cam groove for regulating the zooming and focusing operations of the second lens group moving frame 14. Thus, the distance D4 is shorter than the entire length of the moving cam groove 7c in the direction of the optical axis by the length of a cam groove, which is necessary for a focusing operation. In addition, in the embodiment, during zooming, the second and third lens group moving frames 14 and 13 function in the same manner.

Next, the operation of the embodiment during zooming will be described. Hereinbelow, the motion of a focusing lens (13) from an infinite position to a nearest position will be described as an example when the embodiment is set in a shortest focal length, that is, a wide end side.

First, the focus ring 8 is manually rotated counterclockwise when seen from the rear side along the optical axis. During this period, no rotational operation is performed for the zoom ring 5. The zoom ring 5 and the zoom ring 7 which is united with the zoom ring 5 in a rotational direction, are not rotated. The rotational motion of the focus ring 6 is transmitted through the guiding groove 6b to the cam pin 20. Then, the cam pin 20 is moved from an infinite position I to a nearest position K along the moving cam groove 7d of the cam ring in accordance with the shape of the groove (see FIG. 3). Consequently, the second lens group moving frame 14 is moved to the rear side along the optical axis while being rotated. In this case, the moving amount of the second lens group moving frame 14 is equal to the length D of the moving cam groove 7d from the position I to the position K in the direction of the optical axis.

As described above, in the embodiment, the zoom cam ring 7 is moved in the direction of the optical axis during zooming. Accordingly, the moving amount of each of the second to the fifth lens group moving frames in the direction of the optical axis during the zooming operation, will be an amount, which is obtained by combining the length of each of the moving cam grooves (7a to 7d) provided in the cam ring 7, with the moving amount D1 of the cam ring 7 itself, in the direction of the optical axis. In other words, in the embodiment, the length of each of the moving cam grooves (7a to 7d) in the direction of the optical axis, is actually short, the length being equivalent to an amount which is obtained by subtracting the moving amount of the zoom cam ring 7 in the direction of the optical axis, from the moving amount of each lens group moving frame in the same direction. As a result, the zoom cam ring 7 is also shorter in the direction of the optical axis and thereby a lens barrel can be constructed in a compact form in the direction of the optical axis.

The first lens groups L1 and L2 of the embodiment change their moving directions in the midway of the zooming operation. In other words, the lens groups L1 and L2 are of making U-turns along the optical axis. In the embodiment, the first lens groups L1 and L2 are driven by using the moving cam groove 2b, which is a member completely different from the zoom cam ring 7 and provided in the inner fixed barrel 2.

The first lens groups L1 and L2 change the focal length of the entire optical system by accurately operating together with the other lens groups during zooming. For this reason, it is preferred that the moving cam groove 2b for driving the first lens groups L1 and L2 is provided in the member, in which the other moving cam grooves are provided, so as to limit a zooming error to a minimum between the first lens groups and the other lens groups.

However, the lens groups which make U-turns and the zoom cam ring 7 naturally have zooming operation ranges in which the moving directions are opposite to each other. Thus, if the moving cam groove 2b were provided in the zoom cam ring 7 as in the case of the other moving cam grooves, it would be necessary to set the length of the moving cam groove 2b in the direction of the optical axis to D1+D6, D1 being a distance of a movement in a direction opposite to that for the zoom cam ring 7. It would also be necessary to accordingly set the zoom cam ring 7 sufficiently long in the direction of the optical axis. Consequently, it would be difficult to arrange the zoom cam ring 7 in the lens barrel having a specified length.

The invention was made against the prior art, within which it is considered as best to provide all the moving cam grooves in the same cam ring. In the embodiment according to the invention, the moving cam groove 2b is provided separately from and independently of the zoom cam ring 7. Therefore, an increase in the length of the zoom cam ring 7 in the direction of the optical axis, is prevented, whereby a compact zoom lens barrel can be provided.

Furthermore, in the embodiment, the moving cam groove 2b is never moved in the direction of the optical axis so as to restrain the relative moving amounts of the moving cam groove 2b and the first lens groups L1 and L2 to small levels, in any of the cases where the first lens groups L1 and L2 are moved to the front and the rear side along the optical axis. Accordingly, the length of the moving cam groove 2b in the direction of the optical axis, is prevented from being longer in comparison with the rotational angle of the zoom cam ring 7, and the angle of the moving cam groove 2b relative to the optical axis is maintained to be big. As a result, in the cam mechanism which includes the moving cam groove 2b, zooming torque is controlled to be low and the working efficiency of the mechanism is better than that of the conventional zoom lens barrel. This good working efficiency can be seen particularly in a region (region from the position L to the position M of the moving cam groove 2b shown in FIG. 2), in which the first lens groups L1 and L2 are moved in a direction opposite to that for the zoom cam ring 7. In short, in the embodiment, compared with the prior art, a zoom lens having better zooming operability can be provided.

As apparent from the foregoing, according to the present invention, in the zoom lens barrel including a driving mechanism for driving an optical system in the direction of an optical axis while being moved in the direction of the optical axis during a zooming operation, at least a part of the optical system being a U-turn optical system which makes a change in its moving direction during the zooming operation, by providing another driving mechanism never moved in the direction of the optical axis for driving the U-turn optical system independently of the former driving mechanism, zooming operability can be improved and the zoom lens barrel can be constructed to be compact in the direction of the optical axis.

Although the preferred embodiment of the present invention has been described in detail, it should be understood that various changes, substitutions and alternations can be made therein without departing from spirit and scope of the inventions as defined by the appended claims.

What is claimed is:

1. A zoom lens barrel comprising:
   a first optical system;
   a second optical system;
   a first driving mechanism for driving the first optical system in a direction along an optical axis while being moved in the direction along the optical axis during a zooming operation, the first driving mechanism positioned inside a fixed barrel and including a cam ring having a first cam groove for engaging a first cam pin, the first cam pin being secured to the first optical system; and a second driving mechanism for driving the second optical system in the direction along the optical axis without being moved in the direction along the optical axis during the zooming operation, the second driving mechanism including a second cam groove formed in an outer portion of the fixed barrel and a second cam pin for engaging the second cam groove, the second cam pin being secured to the second optical system;

wherein the second optical system reverses its moving direction at least once during the zooming operation in which the second optical system goes from any one of a tele end position and a wide end position to another position.

2. A zoom lens barrel according to claim 1, wherein the cam ring is rotatable around the optical axis and movable in the direction along the optical axis, and wherein the fixed barrel is fixed in the zoom lens barrel; and wherein the second cam groove is shaped to allow for movement of the second optical system initially in the direction along the optical axis and then in an opposite direction relative to the direction along the direction of the optical axis while the second cam pin moves from one end of the second cam groove to an opposite end of the second cam groove.

3. A zoom lens barrel according to claim 2, wherein the second cam groove has a V shape.

4. A zoom lens barrel according to claim 2, wherein a moving amount of the first optical system in the direction along the optical axis relative to the lens barrel is a difference between a moving amount of the first cam pin in the direction along the optical axis moved along the first cam groove and a moving amount of the cam ring in the direction along the optical axis.

5. A zoom lens barrel comprising:

a first optical system;

a second optical system;

a first driving mechanism for driving the first optical system in a direction along an optical axis while being moved in the direction along the optical axis during a zooming operation; and a second driving mechanism for driving the second optical system in the direction along the optical axis without being moved in the direction along the optical axis during the zooming operation;

wherein the second optical system reverses its moving direction at least once during the zooming operation in which the second optical system goes from any one of a tele end position and a wide end position to another position;

wherein the first driving mechanism includes a first cam groove formed in a cam ring rotatable around an optical axis and movable in the direction along the optical axis, and a first cam pin connected to the first optical system and engaged with the first cam groove, and wherein the second driving mechanism includes a second cam groove formed in an outer periphery of a fixed barrel, wherein the fixed barrel is fixed in the zoom lens barrel, and a second cam pin connected to the second optical system and engaged with the second cam groove;

wherein the second cam groove is shaped to allow for movement of the second optical system initially in the direction along the optical axis and then in an opposite direction relative to the direction along the direction of the optical axis while the second cam pin moves from one end of the second cam groove to an opposite end of the second cam groove; and wherein the first cam pin penetrates through the fixed barrel in a radial direction, and a relief groove for preventing a movement of the first cam pin from being limited is formed in the fixed barrel.

6. A zoom lens assembly comprising:

a first lens group secured in an inner fixed barrel, the inner fixed barrel including a first cam groove for engaging a first cam pin and a zoom cam ring positioned within the inner fixed barrel;

a second lens group secured in the zoom cam ring, the zoom cam ring being rotatable and having a second cam groove for engaging a second cam pin, wherein the first lens group is movable along an axis of the inner fixed barrel, wherein the second lens group is movable along the axis of the inner fixed barrel, and wherein movement of the first cam pin from a first end portion of the first cam groove to a second end portion of the first cam groove moves the first lens group initially towards a rear side of the inner fixed barrel and then towards a front side of the inner fixed barrel.

7. The zoom lens assembly according to claim 6, wherein the first lens group includes a first lens moving frame for mounting at least one lens and for attaching the first cam pin.

8. The zoom lens assembly according to claim 6, wherein the second lens group includes a second lens moving frame for mounting at least one lens and for attaching the second cam pin.

9. The zoom lens assembly according to claim 6, wherein the second cam pin penetrates the inner fixed barrel, and wherein a relief groove is formed in the inner fixed barrel to prevent limiting a movement of the second cam pin.

10. The zoom lens assembly according to claim 6, wherein the first cam groove has a V shape.

* * * * *